United States Patent

Meunier

[11] Patent Number: 5,687,769
[45] Date of Patent: Nov. 18, 1997

[54] CONFIGURABLE PORT ASSEMBLY

[75] Inventor: Robert Meunier, Portsmouth, R.I.

[73] Assignee: The United States of America as represented by the Secretary of the Navy, Washington, D.C.

[21] Appl. No.: 591,182

[22] Filed: Jan. 16, 1996

[51] Int. Cl.$^6$ ............................................ F15D 1/02
[52] U.S. Cl. ........................ 138/40; 137/269; 137/271
[58] Field of Search ........................... 137/269, 271, 137/270; 251/258, 206; 138/40, 45, 46, 42

[56] References Cited

U.S. PATENT DOCUMENTS

| | | | |
|---|---|---|---|
| 2,959,916 | 11/1960 | Carlton et al. | 138/40 |
| 5,325,887 | 7/1994 | Egli et al. | 137/270 |
| 5,565,063 | 10/1996 | Begemann et al. | 138/46 X |

*Primary Examiner*—Kevin Lee
*Attorney, Agent, or Firm*—Michael J. McGowan; Robert W. Gauthier; Prithvi C. Lall

[57] ABSTRACT

A configurable port assembly is used proximate a medium containing structure, such as a water tunnel, e.g. to measure fluid flow or inject flowing fluid into the tunnel. The configurable port assembly includes at least two configurable port assembly components assembled to define a configurable port extending from a first opening to a second opening. One or more of the configurable port assembly components can be rotated from a first to a second assembled position to define a configurable port having at least two predefined shapes. The configurable port assembly preferably includes four configurable port assembly components assembled and coupled together with coupling members, such as dowel pins, extending through the components. Two of the configurable port assembly components have shaped surfaces that define a shaped thickness of the configurable port while the other two components have shaped surfaces that define a shaped width of the port. Various shapes can be machined in the configurable port assembly components to provide numerous variations of the configurable port.

17 Claims, 4 Drawing Sheets

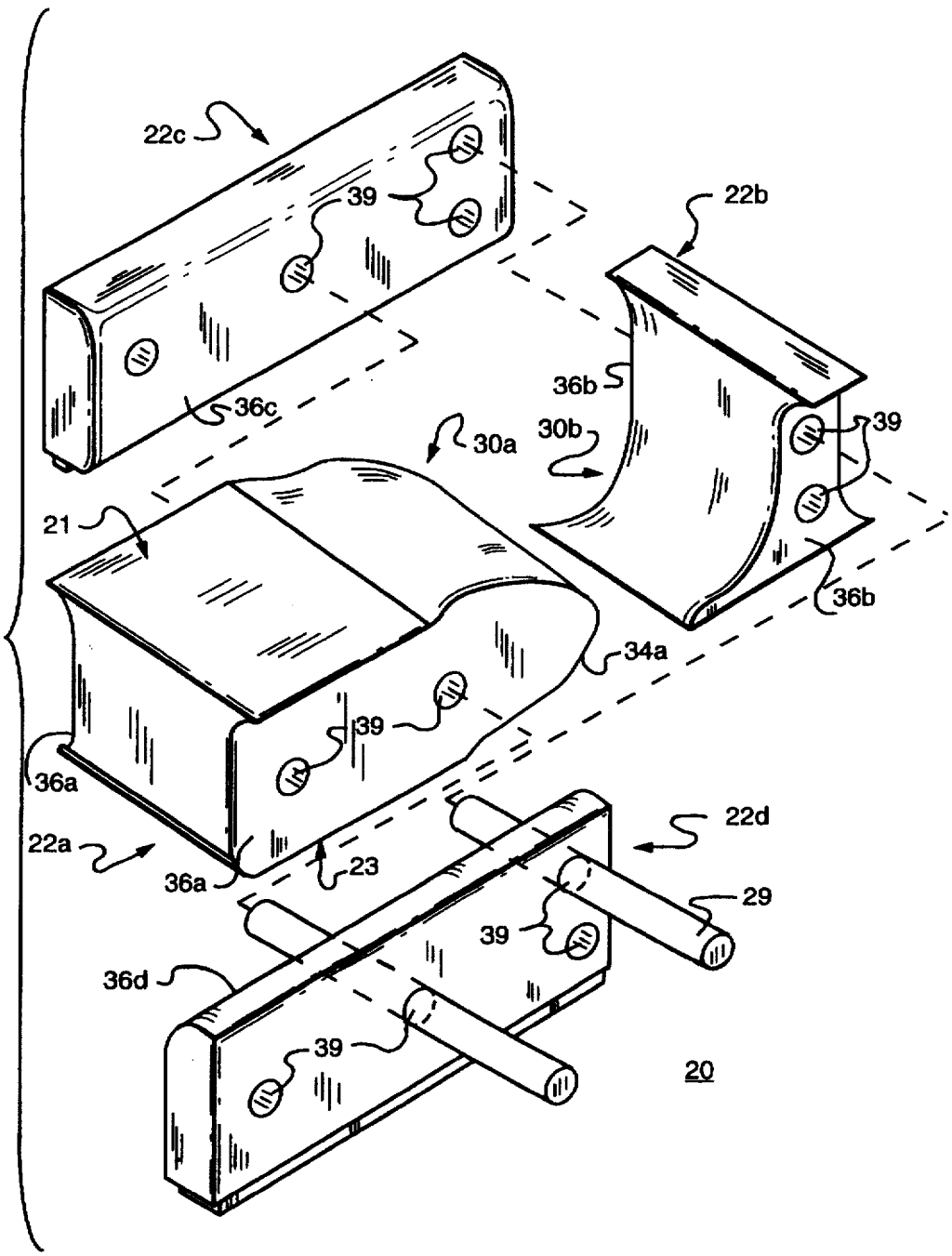

CONFIGURABLE PORT ASSEMBLY

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

This invention relates to ports for water tunnels and in particular, to a configurable port assembly.

(2) Description of the Prior Art

Measuring and testing a flowing fluid or other medium flowing in a tunnel or similar structure is often necessary, for example, by inserting a flow measuring device into the flowing fluid, by injecting a substance into the flowing fluid, or by ejecting or extracting the flowing fluid from the tunnel.

In water tunnels and other similar structures containing a flowing fluid or medium, one may need access to the fluid flowing within the tunnel or similar structure without allowing the flowing fluid to escape from the tunnel. Water tunnels and other similar structures typically have a receptacle in a wall of the tunnel to receive devices that interact with the flowing fluid, e.g., by measuring the flow or by injecting a flowing fluid into the fluid stream.

A block having a port, such as an ejector block, positioned in the receptacle in the water tunnel or similar structure is one way in which one can access the flowing fluid to measure fluid flow or inject flowing fluid into the tunnel. Prior art blocks having ports comprise a solid block of material having a slot extending through the block of material forming a shaped port. In some cases, the slot is milled in the solid block of material. In other cases, where the desired shape of the port cannot be achieved by milling a slot, a casting is made.

Such prior art blocks comprised of a single solid block of material are of limited usage in that the block provides only one shape for the port or slot. To provide a number of different shapes of ports requires a plurality of solid blocks with a different shaped port or slot formed in each block. The milling process, however, is limited in the types of shapes that can be formed. The casting process can make a wider variety of shapes but is unnecessarily expensive. Thus, manufacturing prior art blocks with ports or slots of varying shapes has involved a significant amount of material and time as well as a complex and expensive process.

SUMMARY OF THE INVENTION

Accordingly, one object of the present invention is to provide a configurable port assembly that can be assembled into a variety of configurations having ports or slots with different shapes. Another object of the present invention is to provide a port assembly which can be easily and inexpensively fabricated with conventional machining processes. A still further object is to provide a port assembly which can easily be reconfigured without the use of special tools.

These objects are accomplished with the present invention by providing a configurable port assembly for use in a structure containing a medium, such as a flowing fluid. The configurable port assembly includes at least two configurable port assembly components assembled in at least one predetermined configuration. The configurable port assembly components, when assembled in the predetermined configuration, form a first opening in a first side of the configurable port assembly and a second opening in a second side of the configurable port assembly. A configurable port or slot having at least one predefined shape extends from the first opening to the second opening and is defined by the configurable port assembly components.

The configurable port assembly components are adapted to be assembled in a plurality of predetermined configurations to form configurable ports or slots having a plurality of predefined shapes. Each configurable port assembly component includes a shaped surface that forms a portion of the configurable port. Unlike machining or casting a slotted opening in a port comprising a solid block, the shaped surfaces of the port assembly components are easily machined to the desired configuration.

The shaped surface of at least one of the configurable port assembly components is adapted to form a configurable port having a first predefined shape when the configurable port assembly component is assembled in a first assembled position and is adapted to form configurable port having a second predefined shape when assembled in a second assembled position. Thus, the configurable port assembly according to the present invention can be configured to form ports or slots having various shapes and thus improves versatility.

In the preferred embodiment, the configurable port assembly includes at least four configurable port assembly components assembled in at least one predetermined configuration. Each of the four configurable port assembly components includes at least one shaped surface defining a portion of the configurable port. At least two of the four configurable port assembly components can be assembled in first and second assembled positions to form configurable ports having a plurality of predefined shapes.

Each configurable port assembly component includes at least one port assembly component engaging surface, for engaging with at least one other configurable port assembly component. The configurable port assembly components preferably include at least one coupling member engaging portion, for engaging a coupling member and securing the configurable port assembly component to other configurable port assembly components.

In the preferred embodiment, the coupling members include pin coupling members, and the coupling member engaging portion includes a hole, for receiving a pin coupling member and securing the configurable port assembly components together in an assembled position. Thus, the configurable port assembly components can easily be assembled and coupled without tools into a plurality of predetermined configurations to form ports or slots of various shapes.

BRIEF DESCRIPTION OF THE DRAWINGS

These and other features and advantages of the present invention will be better understood in view of the following description of the invention taken together with the drawings wherein corresponding reference characters indicate corresponding parts throughout the several views of the drawings and wherein:

FIG. 3 is a perspective view of a configurable port assembly comprising configurable port assembly components in a disassembled condition according to the present invention;

DESCRIPTION OF THE PREFERRED EMBODIMENT

Figure 1:
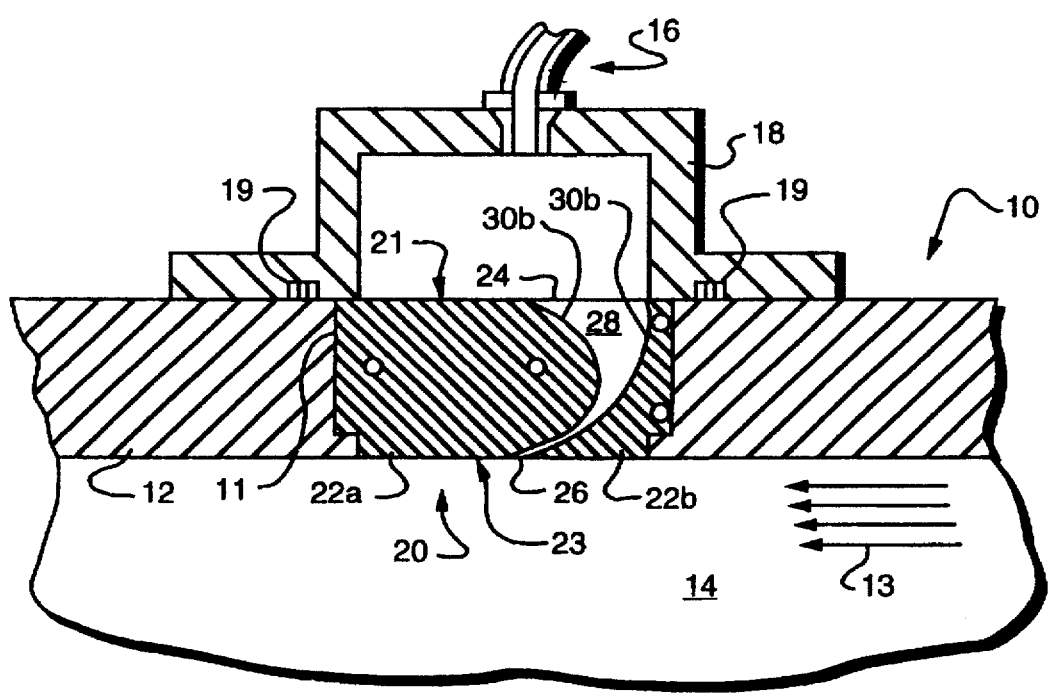
FIG. 1 is a cross-sectional view of a configurable assembly, according to the present invention, positioned in a receptacle of a flowing fluid containing structure.

Referring to FIG. 1, a configurable port assembly 20, according to the present invention, is used in a structure 10, such as a tunnel, containing a medium 14, such as flowing fluid. For example, the configurable port assembly 20 can be positioned in a receptacle 11 disposed in a wall 12 of the structure 10. Typically, the configurable port assembly 20 is used in a structure 10 containing a flowing fluid 14.

The configurable port assembly 20 has a first or top side 21 and second or bottom side 23 and includes at least two configurable port assembly components 22a, 22b. The configurable port assembly components 22a, 22b form a configurable port or slot 28 having a first opening 24 proximate the first side 21 and a second opening 26 proximate the second side 23. The configurable port assembly components 22a, 22b each include at least one shaped surface 30a, 30b and once assembled in a predetermined configuration, form the configurable port or slot 28 having a predefined shape. The configurable port assembly components 22a, 22b are also adapted to be assembled in other predetermined configurations to form a configurable port assembly port or slot 28 having other predefined shapes, as will be described in greater detail below.

In one example, the configurable port assembly 20 is used to inject a substance, such as a liquid, into the flowing fluid or other medium 14. In this example, a conduit 16 conveys the flowing fluid to the configurable port assembly 20. The conduit 16 is fluidly coupled to a cover 18 which is coupled to the structure 10. The cover 18 is positioned over the configurable port assembly 20 and preferably is shaped to retain the configurable port assembly 20 in the receptacle 11. The cover 18 also preferably includes one or more seals 19, for sealing the cover 18 to the structure 10 and preventing flowing fluid from escaping.

In this example, the first opening 24 in port 28 acts as an inlet allowing a flowing fluid or other substance from the conduit 16 (which is coupled to a fluid source, not shown) to enter the configurable port or slot 28. The second opening 26 acts as an outlet allowing the fluid or substance to be injected into the flowing fluid 14 contained in or flowing past the structure 10. If the flowing fluid 14 is flowing in the direction indicated by arrows 13, the second opening or outlet 26 is preferably designed so that flowing fluid can be injected into the structure 10 without the flowing fluid 14 escaping through the configurable port or slot 28.

In addition to being used for injection or infusion of a fluid or substance, the present invention contemplates using the configurable port 28 for ejection or removal of a medium or substance, such as fluid, from the structure 10 and for measuring or testing a condition of the medium contained in the structure, such as flow rate, temperature, and chemical composition.

Figure 2:
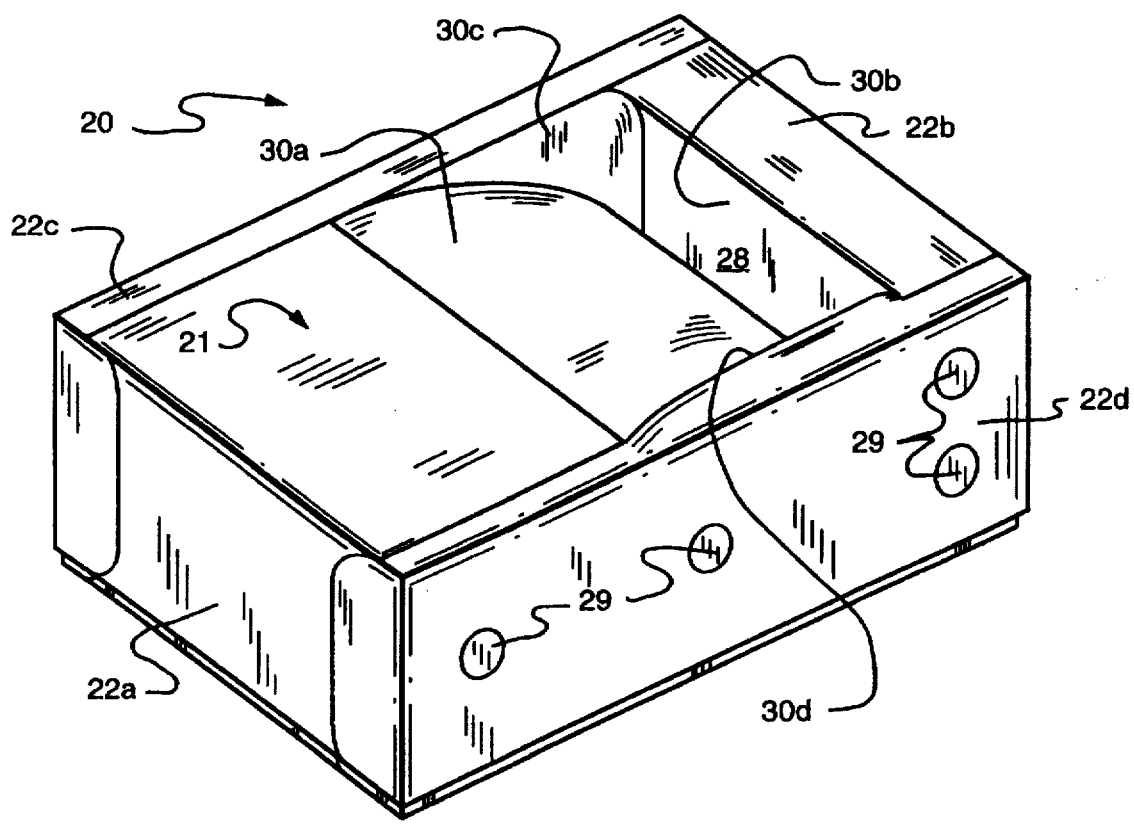
FIG. 2 is a perspective view of a configurable port assembly assembled in a predetermined configuration according to one embodiment of the present invention.
Figure 5A:
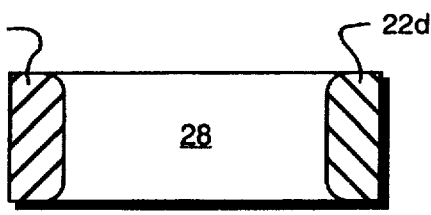
FIGS. 5A–5F are cross-sectional views of configurable ports having various shapes defined by third and fourth configurable port assembly components according to various embodiments of the present invention.
Figure 5B:
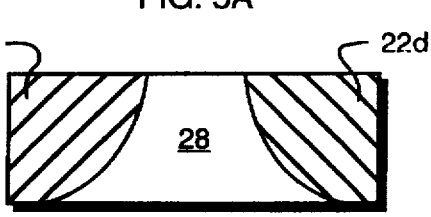
Figure 5C:
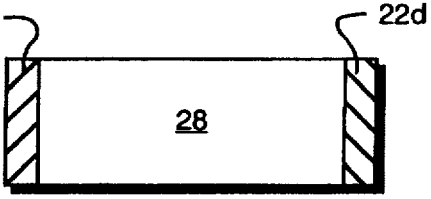
Figure 5D:
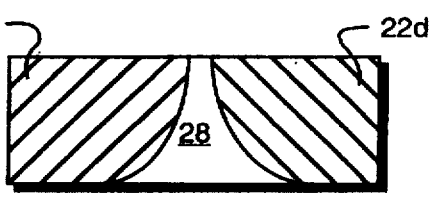
Figure 5E:
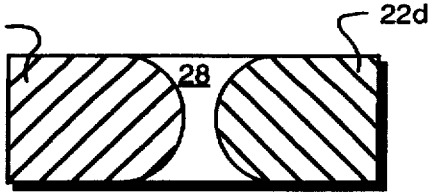

Referring now to FIG. 2, a preferred embodiment is shown wherein the configurable port assembly 20 includes four configurable port assembly components 22a–22d assembled in at least one predetermined configuration to form the configurable port slot 28. The assembled configurable port assembly components 22a–22d preferably form an outer shape, such as a block shape, adapted to fit in receptacle 11 of FIG. 1.

The four configurable port assembly components 22a–22d are preferably coupled together in the assembled condition with coupling members 29. The preferred coupling members 29 include pin coupling members, such as dowel pins, extending through the four configurable port assembly components 22a–22d, as will be described in greater detail below.

Each configurable port assembly component 22a–22d includes one or more shaped surfaces 30a–30d. The shaped surfaces 30a–30d, one such shaped surface on each respective configurable port assembly component 22a–22d, cooperate to form, when assembled, the configurable port 28. First and second configurable port assembly components 22a, 22b are assembled with shaped surfaces 30a, 30b opposite one another to form corresponding sides of the configurable port 28. Third and fourth configurable port assembly components 22c, 22d are assembled with shaped surfaces 30c, 30d opposite one another, forming their respective corresponding sides of the configurable port 28.

Referring now to FIG. 3, there is shown an exploded view of the port assembly of FIG. 2. At least a first configurable port assembly component 22a includes a shaped surface 30a. The first configurable port assembly component 22a can be assembled in a first and second assembled position to vary the shape of the configurable port 28. In the first assembled position, corresponding to the cross-section of FIG. 1, the first or top portion 21 is proximate the first opening 24 (shown in FIG. 1) and the second or bottom portion 23 is proximate the second opening 26 (also shown in FIG. 1). In the second assembled position (not shown), the first configurable port assembly component 22a is rotated 180 degrees so that the second portion 23 is proximate the first opening 24 and the first portion 21 is proximate the second opening 26.

In the preferred embodiment, a second configurable port assembly component 22b also includes a shaped surface 30b. The present invention contemplates rotating the second configurable port assembly 22b in the same way (180 degrees) as the first configurable port assembly component 22a from a first position to a second position to further vary the shape of the configurable port or slot 28. Thus, the configurable port assembly components 22a–22d provide multiple configurations defining a configurable port or slot 28 having multiple shapes.

Each of the configurable port assembly components 22a–22d include a port assembly component engaging surface 36a–36d, for engaging with another configurable port assembly component when assembled. In the preferred embodiment, the shaped surfaces 36c, 36d of the third and fourth configurable port assembly components 22c, 22d correspond to shaped surfaces 30c and 30d. Surfaces 36c and 36d engage and preferably match the shape of the port assembly component engaging surfaces 36a, 36b of the first and second configurable port assembly components 22a, 22b.

In the preferred embodiment, each configurable port assembly component 22a–22d includes at least one coupling member engaging region 39, such as a hole extending through the configurable port assembly components 22a-22d. Pin coupling members 29, such as dowel pins, extend through holes 39 in the configurable port assembly components 22a-22d to couple the configurable port assembly components 22a-22d in the assembled condition. The regions 39 in each configurable port assembly component 22a-22d are aligned to receive the pin coupling members 29 when the configurable port assembly components 22a-22d are assembled. Thus, the configurable port assembly components 22a-22d can easily be assembled without requiring tools.

Each configurable port assembly component 22a-22d is formed using conventional machining processes. The configurable port assembly components 22a-22d are machined from a material suitable to the flowing fluid environment in which the configurable port assembly 20 is used. For example, any suitable metal, plastic or other material may be used.

Referring now to FIGS. 4A-4F, the first and second configurable port assembly components 22a, 22b are assembled so that the shaped surfaces 30a, 30b (indicated in FIG. 4A) are facing one another and the shaped surfaces 30a, 30b define a shaped thickness of the configurable port 28.

A plurality of different shaped thicknesses of the configurable ports or slots 28 can be formed by machining various shaped surfaces, such as curved surfaces, in first and second configurable port assembly components 22a, 22b. The present invention also contemplates linear shapes as well as curves for the shaped surfaces on first and second configurable port assembly components 22a, 22b.

Figure 4A:
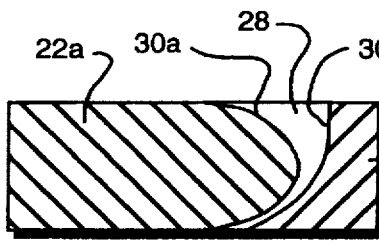
FIGS. 4A–4F are cross-sectional views of configurable ports having various shapes formed by a first and second configurable port assembly component according to various embodiments of the present invention.
Figure 4B:
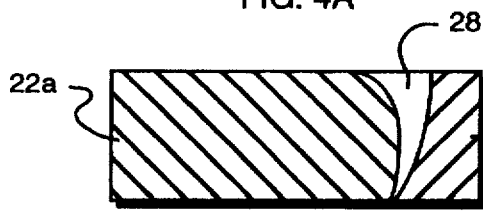
Figure 4C:
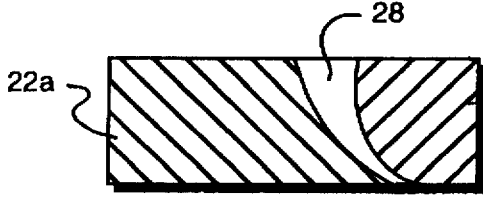
Figure 4D:
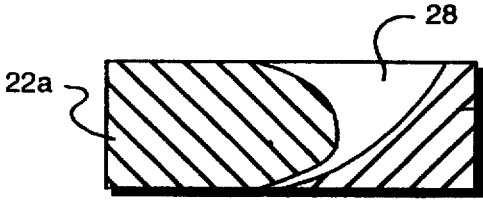
Figure 4E:
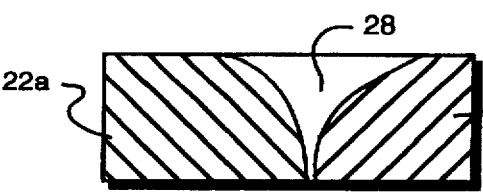
Figure 4F:
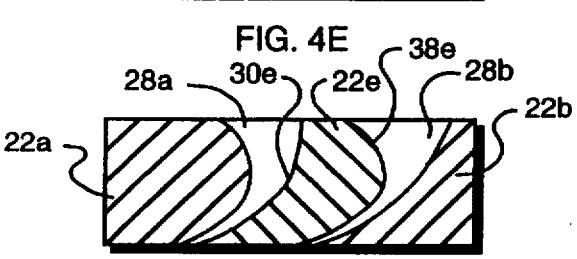
Figure 5F:
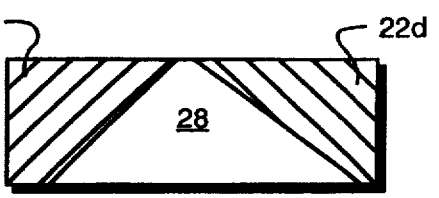

In one embodiment, FIG. 4F, a fifth configurable port assembly component 22e can be provided to form two configurable ports or slots 28a, 28b. The fifth configurable port assembly component 22e includes at least two shaped surfaces 30e, 38e that form a portion of each configurable port 28a, 28b. The fifth configurable port assembly component 22e can also be assembled in first and second assembled positions in the same way as the first and second configurable port assembly components 22a, 22b. The present invention contemplates additional configurable port assembly components to form any desired number of configurable ports in the configurable port assembly.

Referring now to FIGS. 5A-5F, the third and fourth configurable port assembly components 22c, 22d are assembled so that shaped surfaces 30c, 30d (indicated in FIG. 5A) are facing one another to define a shaped width of the configurable port 28. A plurality of shaped widths of the configurable ports or slots 28 can be provided by machining various shaped surfaces on the third and fourth configurable port assembly components 22c, 22d. The present invention contemplates curved shapes as well as linear shapes for the shaped surface on third and fourth configurable port assembly components 22c, 22d.

Accordingly, the configurable port assembly according to the present invention provides a port assembly that is easily and relatively inexpensively fabricated with conventional machining processes. The configurable port assembly can also be assembled and disassembled without tools to form a wide variety of port or slot configurations. The preferred embodiment comprises four components which mate and engage to form the port assembly. A series of pins hold the components together. When assembled, the components fit within a receptacle in a tunnel or similar structure through which a fluid is flowing. The components have shaped surfaces which form the sides of a port or slot through the assembly, such that instruments may be inserted through the port into the fluid, a second fluid may be injected into the fluid stream through the port, or a portion of the fluid stream may be extracted through the port.

Obviously, many modifications and variations of the present invention may become apparent in light of the above teachings. In addition to varying the shaped surfaces to change the shape of the port, the outside shape of the assembly may be varied to suit the receptacle or the fluid stream. Depending on the purpose of the port, the shape of surfaces in contact with the fluid may be varied to provide a range of flow conditions from laminar to turbulent in the vicinity of the port. As previously indicated, the material from which the assembly components are fabricated may be varied to suit the fluid flow and test requirements.

In light of the above, it is therefore understood that within the scope of the appended claims, the invention may be practiced otherwise than as specifically described.

What is claimed is:

1. A configurable port assembly, for use proximate a structure containing a medium, said configurable port assembly comprising:

at least two configurable port assembly components assembled in at least one predetermined configuration;

a first side of said configurable port assembly having a first opening formed by said at least two configurable port assembly components assembled in said at least one predetermined configuration;

a second side of said configurable port assembly having a second opening formed by said at least two configurable port assembly components assembled in said at least one predetermined configuration; and a configurable port extending from said first opening to said second opening, said configurable port having at least one predefined shape defined by said at least two configurable port assembly components assembled in said at least one predetermined configuration.

2. The configurable port assembly of claim 1 wherein said at least two configurable port assembly components are adapted to be assembled in a plurality of predetermined configurations to form configurable ports having a plurality of predefined shapes.

3. The configurable port assembly of claim 1 further including a plurality of coupling members, for coupling said at least two configurable port assembly components together in said at least one predetermined configuration.

4. The configurable port assembly of claim 3 wherein said plurality of coupling members include a plurality of pin coupling members, and each of said at least two configurable port assembly components include at least one hole, and wherein said pin coupling members extend through said at least one hole in said at least two configurable port assembly components.

5. The configurable port assembly of claim 1 wherein each configurable port assembly component of said at least two configurable port assembly components includes at least one shaped surface, wherein said at least one shaped surface of each of said at least two configurable port assembly components define said configurable port.

6. The configurable port assembly of claim 1 wherein said at least two configurable port assembly components includes four configurable port assembly components, each of said four configurable port assembly components including at least one shaped surface, wherein said at least one shaped surface of said four configurable port assembly components define said configurable port.

7. The configurable port assembly of claim 1 wherein said at least two configurable port assembly components are assembled in a block shape.

8. A configurable port assembly component, for use in a configurable port assembly, said configurable port assembly component comprising:

at least one shaped surface, said at least one shaped surface adapted to form at least a portion of a configurable port, said configurable port having a first predefined shape when said configurable port assembly component is assembled in a first assembled position with at least one other configurable port assembly component, and said at least one shaped surface being adapted to form at least a portion of a configurable port slot having a second predefined shape when said configurable port assembly component is assembled in a second assembled position with said at least one other configurable port assembly component; and at least one port assembly component engaging surface, for engaging with at least one other configurable port assembly component.

9. The configurable port assembly component of claim 8 wherein said at least one shaped surface includes at least first and second shaped surface portions, wherein said first shaped surface portion forms a first opening of said configurable port and said second shaped surface portion forms a second opening of said configurable port when said configurable port assembly component is assembled in said first assembled position, and wherein said first shaped surface portion forms said second opening of said configurable port and said second shaped surface portion forms said first opening of said configurable port when said configurable assembly component is assembled in said second assembled position.

10. The configurable port assembly component of claim 8 further including at least one coupling member engaging region, for engaging with at least one coupling member and securing said configurable port assembly component to said at least one other configurable port assembly component.

11. The configurable port assembly component of claim 10 wherein said at least one coupling member engaging region includes a hole, for receiving at least one pin coupling member and securing said configurable port assembly component to said at least one other configurable port assembly component.

12. A configurable port assembly, for use in a flowing fluid containing structure, wherein:

said configurable port assembly comprises at least first and second configurable port assembly components adapted to be assembled to form a configurable port, each of said at least first and second configurable port assembly components including at least one shaped surface, for forming at least a portion of said configurable port;

said at least one shaped surface of at least said first configurable port assembly component is adapted to form a configurable port having a first predefined shape when said at least said first configurable port assembly component is assembled in a first assembled position; and said at least one shaped surface of said at least said first configurable port assembly component is adapted to form a configurable port having a second predefined shape when said at least said first configurable port assembly components is assembled in a second assembled position.

13. The configurable port assembly of claim 12 wherein said at least one shaped surface of said at least said first configurable port assembly component includes at least first and second shaped surface portions, wherein said first shaped surface portion forms a first opening of said configurable port having said first predefined shape when said at least said first configurable port assembly component is positioned in said first assembled position, and wherein said first shaped surface portion forms a second opening of said configurable port having said second predefined shape when said at least said first configurable port assembly component is positioned in said second assembled position.

14. The configurable port assembly of claim 12 wherein said at least one shaped surface of said second configurable port assembly component is adapted to form a configurable port having a third predefined shape when said second configurable port assembly component is assembled in a first assembled position, and wherein said at least one shaped surface of said second port assembly component is adapted to form a configurable port having a fourth predefined shape when said second configurable port assembly component is assembled in a second assembled position.

15. The configurable port assembly of claim 12 further including a plurality of coupling members, for coupling said at least first and second configurable port assembly components in said at least first and second predetermined configurations.

16. The configurable port assembly of claim 12 further including at least third and fourth configurable port assembly components, each of said at least third and fourth configurable port assembly components including at least one shaped surface, wherein said first, second, third, and fourth configurable port assembly components are adapted to be assembled to form said configurable port.

17. The configurable port assembly of claim 16 wherein said at least one shaped surface of said first and second configurable port assembly components define a shaped thickness of said configurable port and wherein said at least one shaped surface of said third and fourth configurable port assembly components define a shaped width of said configurable port.

\* \* \* \* \*